United States Patent [19]

Kirk, Jr.

[11] 3,859,457

[45] Jan. 7, 1975

[54] SELECTIVE VIDEO RECEPTION INHIBITING APPARATUS

[75] Inventor: Donald Kirk, Jr., St. Petersburg, Fla.

[73] Assignee: Digital Communications Inc., St. Petersburg, Fla.

[22] Filed: Mar. 28, 1973

[21] Appl. No.: 345,684

Related U.S. Application Data

[63] Continuation-in-part of Ser. No. 146,086, May 24, 1971, Pat. No. 3,730,980.

[52] U.S. Cl. .................. 178/5.1, 325/477, 325/132, 325/483

[51] Int. Cl. .................. H04n 1/44

[58] Field of Search .......... 325/461, 477, 132, 308, 325/483; 178/5.1, DIG. 13

[56] References Cited

UNITED STATES PATENTS 3,019,335 1/1962 Brilliant .................. 325/477

3,504,109 3/1970 Spencer .................. 178/5.1

3,665,321 5/1972 Michnik et al. .................. 325/477

*Primary Examiner*—Maynard R. Wilbur

*Assistant Examiner*—S. C. Buczinski

*Attorney, Agent, or Firm*—Stephen B. Judlowe

[57] ABSTRACT

Selective video suppression apparatus, operative on a per-subscriber basis, comprises a band elimination, notch filter tuned to the spectrum of a video signal to be selectively inhibited. The filter exhibits relatively little attenuation, having only a de minimus effect per se on signal reception.

However, in accordance with the principles of the present invention, filter attenuation is modulated at a rate exceeding the response capacity of a television receiver automatic gain control circuit. The resulting amplitude modulated signal reaching the television receiver is essentially unrecoverable, obviating receiver synchronization, color subcarrier recovery, and generally inhibiting video reception.

16 Claims, 1 Drawing Figure

PATENTED JAN 7 1975 3,859,457
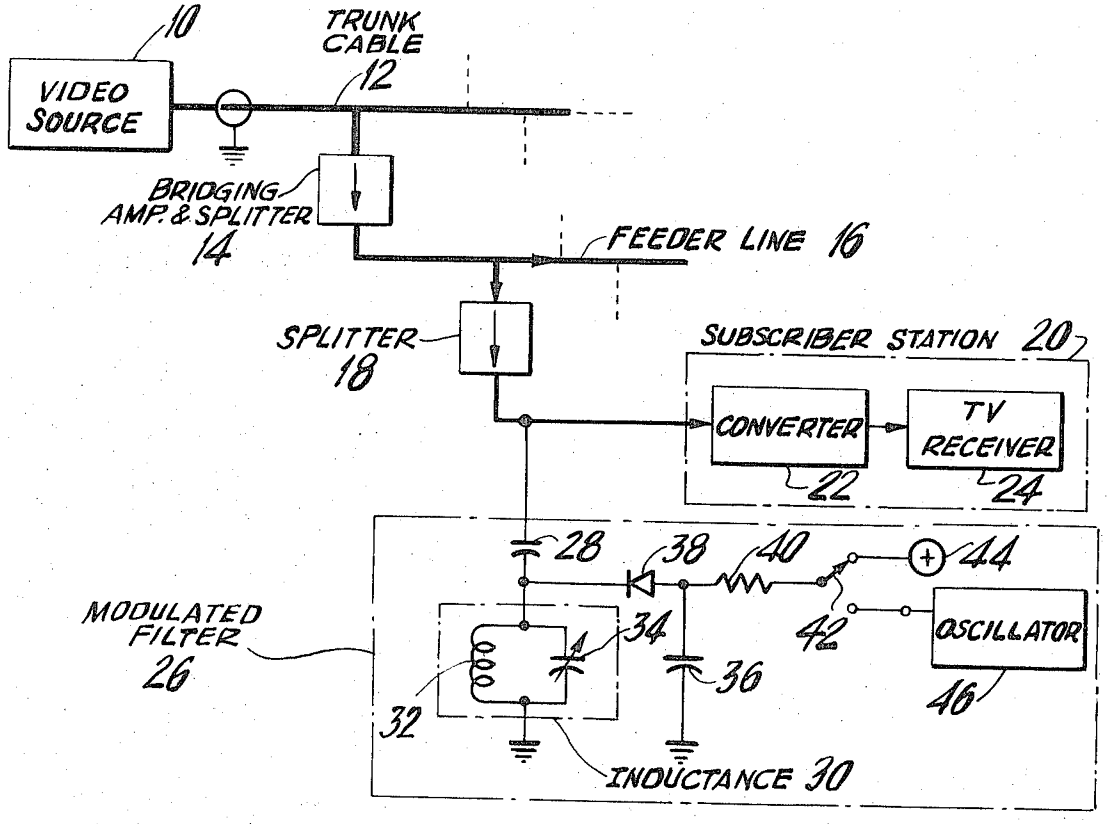

SELECTIVE VIDEO RECEPTION INHIBITING APPARATUS

This application is a continuation-in-part of my co-pending application Ser. No. 146,086 filed May 24, 1971, now U.S. Pat. No. 3,730,980, issued May 1, 1973.

DISCLOSURE OF INVENTION

This invention relates to video distribution systems and, more specifically, to improved apparatus for selectively inhibiting reception of predetermined video information from an ensemble of video signals.

It is sometimes desirable in the dissemination of video programming to provide apparatus for selectively inhibiting reception of predetermined signals. Thus, for example, the above-pending application and also pending application Ser. No. 122,660 filed Mar. 10, 1971 (the disclosures of which are incorporated herein by reference) describe apparatus for distributing on a CATV or MATV cable, or the like, one or more supplementary, premium video programs along with locally available commercial television signals, on an extra fee basis. In these and other systems, the premium channel(s) is transmitted in some vacant portion of the video spectrum, as in the midband between the frequency allocation for channels 6 and 7 or in some locally unused standard telecast channel. To the extent that the midband is used, and/or when the transmitted video signal is electronically encripted, a converter is employed at each subscriber location to permit reception of the premium program via a standard television receiver.

To assure reception of premium signaling only by authorized, participating viewers, it is desirable in some instances to positively assure that the premium video signaling does not reach non-participating subscriber locations in a recoverable condition. Use of a band elimination, or "notch" filter tuned to block (i.e., attenuate) the premium program from reaching certain reception stations was first considered, but is impractical in practice. Basically, it is very difficult to construct a filter which is sufficiently "deep," i.e., exhibits sufficient attenuation, to reduce a strong incoming signal below the recovery level of a television receiver operating at maximum gain (wide open automatic gain control [AGC]); which does not interfere with possible adjacent (in frequency) signals; which is stable in frequency; and which may be economically utilized on a per-subscriber basis.

As an alternative postulated reception inhibiting approach, a large interfering signal may be inserted into the incoming line at the subscriber location, the interfering signal exhibiting a frequency band coincident with that of the premium program. However, such structure risks reverse propagation of the interfering signal disrupting video reception at additional remote subscribers' locations which may be entitled to receive the premium channel.

It is therefore an object of the present invention to provide improved selective video reception-suppression apparatus.

More specifically, it is an object of the present invention to provide selective video reception inhibiting apparatus which may be readily constructed and economically employed on a per-subscriber basis.

The above and other objects of the present invention are realized in specific illustrative video suppression apparatus comprising a band eliminating, notch filter which may be of low grade (e.g., well below 10 db and thus subject to ready construction), and which per se would have only a de minimus effect on the quality of the received premium channel. The filter is, of course, nominally tuned to the premium channel spectrum.

The filter attenuation is then modulated at a rate (e.g., several hundred cycles per second) faster than AGC response capability of television receivers. The effect of the varying amplitude incoming signal supplied to the essentially fixed gain (AGC averaging) receiver is tantamount to a total inability of the receiver to display premium video by reason of incapacitated vertical synchronization, lost color subcarrier recovery, great amplitude intensity differences, and the like.

The above and other features and advantages of the present invention will become more clear from the following detailed description of a specific illustrative embodiment thereof presented hereinbelow in conjunction with the accompanying drawing.

Referring now to the drawing, there is shown a video distribution system which comprises a video source 10, e.g., head end equipment for a CATV or MATV system. The video source 10 will typically supply as an output a plurality of locally available conventional video programs. Moreover, as in accordance with the above-described co-pending patent applications, at least one premium supplementary program may be supplied by the video source as well, e.g., first run movies, theater, sporting events, or the like. The premium signals may be transmitted in any locally vacant portion of the frequency spectrum, e.g., in an unused standard channel band; in the midband spacing between the upper frequency limit of channel 6 and the lower bound of channel 7; or above or below the standard video spectrum. It is hereinafter assumed for purposes of concreteness only, and without limitation, that the video source 10 supplies an ensemble of television programs comprising a plurality of local commercially available signals, and one premium midband program.

The video information supplied by source 10 is supplied for distribution to a CATV or MATV cable, or the like. In an MATV installation such as a hotel/motel, condominium/apartment or the like, the cable 12 may be formed in a network simply comprising a main branch emanating from the head end location and taps (i.e., passive splitters-isolators) for coupling signals to various rooms or apartments as via riser cables. For the CATV context shown in the drawing, a trunk cable 12 is coupled to a feeder line 16, as via a bridging amplifier and splitter 14. The feeder line 16, in turn, is coupled by a splitter 18 to a cable run 19 leading to a particular subscriber station 20, e.g., a dwelling. Other network topographies, with fewer or greater hierarchal distribution levels, may obviously be employed as well.

At the subscriber station 20, there is included a converter 22 which, when activated to receive the private, premium midband channel, shifts that channel to a conventional locally unused frequency allocation (e.g., channel 3 or channel 4 in any area) for reception by a conventional television receiver 24. Moreover, where the premium channel is transmitted in encripted form, the converter 22 decodes the encripted premium signal to permit recovery thereof by the conventional receiver. Again reference is made to the above-identified co-pending applications disclosing specific converter apparatus operable with specific illustrative head end video transmission apparatus. As above noted, however, signal encription is not necessary for practice of the present invention.

It is typically desired in premium video distribution that recovery of the premium signals be limited to those subscribers willing and in fact paying for the extra service. This is to a large extent controlled by the distribution of converters 22 by the CATV system operator who obtains revenues on account of use of the converter 22 at each subscriber location. Moreover, such converter 22 may be key or otherwise selectively actuated to further restrict the use thereof. However, the surreptitious use of illicit converters is not unknown in the CATV industry and, in some instances, positive assurance is required that subscribers cannot receive the premium signal notwithstanding the fact that they may have converter equipment. Of course, such subscribers must continue to receive from the cable 19 all conventional programming notwithstanding their inability to receive the private signaling.

To this end, there is connected to the cable 19 leading to each subscriber station a modulated filter 26. The composite filter 26 includes a series resonant circuit comprising a capacitor 28, preferably of reasonably small value, and an effective inductance 30 comprising a coil 32 and parallel-connected variable capacitor 34 (together with stray capacitance shunting the tank circuit 32–34, including the effective capacitance of a diode 38). The capacitance of the variable capacitor 34 is adjusted such that the composite parallel resonant circuit 32–34-stray is slightly below resonance at the spectrum of the premium program transmitted by the video source 10 (and thus appears inductive), such that the series resonant circuit comprising the capacitance 28 and the effective inductance 30 is tuned to the video carrier of the premium program. Accordingly, the series resonant circuit 28–30 provides a low impedance to ground for the premium signal.

The effective attenuation produced by the band elimination notch filter 28–30 need not be, and for the construction of the drawing in fact typically will not be very great. Thus, for example, the attenuation may be as little as 3–6 db although any larger attenuation may obtain as well. However, as a general matter and in any event, the series resonant circuit 28–30 does not per se provide anywhere near the attenuation required to reduce the premium program in the cable 19 to a level where it would not be recoverable by the television receiver 24, when the receiver operates in a high gain state under control of its automatic gain control (AGC) circuitry. It is observed at this point for purposes which will become more clear from the following that the automatic gain control circuitry of television receivers operates relatively slowly, i.e., has a very limited band width and requires a relatively long period of time to change receiver gain. A typical AGC circuit may require, for example, a circuit coupling to 15 or 20 horizontal line scans, i.e., each of about 60 microseconds, to make a significant gain adjustment.

Connected between the capacitor 28 and the resonant circuit 32–34 is a diode 38 having its anode bypassed to ground by a relatively large value capacitor 36. The anode of the diode 38 is connected by a resistor 40 and a switch 42 either to a positive voltage source 44 (the switch 42 upward position which permits reception of the premium channel) or to the output of an oscillator 46, the downward switch 42 position coupling inhibiting reception of the premium video signal. The oscillator 46 may provide output signals of any convenient form, e.g., sinusoidal, square wave as the output of a multivibrator, or of any other form. The frequency of the oscillations provided by source 46 thereof is made sufficiently large such that they exceed the capacity of television receiver automatic gain control circuits, i.e., such that television receivers cannot track and provide gain compensation at the frequency provided by the oscillator 46. One convenient frequency range is hundreds of cycles per second, e.g., 200 Hz.

Consider first the situation where the switch 42 is in its upward position as shown in the drawing, whereupon the subscriber at station 20 is permitted to receive the premium signal. With this switch positioning, current flows from the source 44 via the resistor 40 through the diode 38 and the inductor 32 to ground, turning the diode 38 hard on. In this condition, the diode 38 exhibits essentially a very low impedance at radio frequency, to effectively short circuit the tank circuit 32–34 with a low impedance (at radio frequency) comprising the diode 38 of the capacitor 36. Thus, at radio frequency, the filter 26 impedance presented to the cable 19 is essentially the series combination of the capacitance 28 and 36 and, the capacitance of element 36 being much larger than that of element 28, the capacitance of the element 28 which may be 1 or 2 picofarads. This has substantially no effect on the premium (or any other) signal and thus the entire ensemble of signals — including the premium program — on the cable propagate to the subscriber station 20 for reception.

Consider now the condition where the switch 42 resides in its lower position to inhibit reception of the premium signal. During those periods when the oscillator 36 provides a relatively high output potential, circuit functioning identical to that considered above for the potential supplied by the voltage source 44 obtains, and the signal on the cable 19 progresses to the subscriber station 20 essentially unattenuated. However, during those periods when the oscillator 46 provides a relatively low output potential, the diode 38 is reverse biased and thus turned off. Accordingly, the series band rejection filter comprising the capacitance 38 and the effective inductance 30 is connected across the line to attenuate the premium channel (only) to the extent of several db. Thus, the premium channel rapidly varies in intensity at the frequency of the oscillator 46.

The incoming premium signal, varied in amplitude as above described, is shifted by the converter 22 (if employed and as necessary) and progresses to the television receiver 24. As a practical matter, the signal is unrecoverable at the receiver by reason of several electronic mechanisms. First it is again observed that the amplitude valuation of the signal occurs at a rate which exceeds the ability of the AGC receiver circuit to compensate for those variations. Accordingly, the signals occurring during the unattenuated intervals are received by the television receiver sync and video circuitry in a form substantially greater than the signals which occur during the attenuated intervals, the band limited AGC circuit effectively operating in an averaging mode. The overly large video information detected by the television receiver 24 during the unattenuated circuits appear as erratic spurious synchronization pulses defeating vertical picture synchronization. The signal as recovered also causes total loss of color subcarrier information recovery. By further mechanisms including the appearance of spurious line trace synchronization disruptions, intensity variations, and the like, the simple fact is that the video information is totally unrecognizable and thus the premium video information is effectively blocked from reception at the subscriber station 20.

It is thus observed that by operating the switch 42 at some location outside the subscriber's home, a CATV operator may with assurance inhibit reception of premium information from subscriber stations not paying for that class of service while not affecting the ability of the subscriber to receive standard programming from the cable. Moreover, it is observed that the modulated filter construction of the drawing is extremely inexpensive; does not require careful construction or expensive components; and is economically feasible for installation on the cable line going to each subscriber.

Further with respect to the foregoing, it is observed that by employing a silicon diode 38, the effective capacitance of the diode varies with the current therethrough. Accordingly, the effective resonant points of the tank circuit 32–34, and of the series trap circuit 28–30, vary through a small range of frequencies during each operative cycle of the oscillator 46 such that the video carrier will be attenuated notwithstanding some drift in the values exhibited by the passive circuit elements in the filter 26. This again assures reliability of the attenuation exhibited by the composite filter 26 while also permitting construction thereof with inexpensive components not requiring precise alignment or alignment maintenance.

It is also observed that the mechanical switch 32 is shown in the drawing as one specific example of switch implementation, adapted for manual operation by CATV operator personnel who physically position the switch to its upward position when a subscriber orders premium programming service. However, the switch 42 may in fact be electronic in nature (or, equivalent thereto, the oscillator 46 may be gated to operate either in a fixed high potential output or an oscillating mode) under local or remote electronic control. Thus, for example, reception of a premium program may be billed on a per program basis by providing registers for controlling an electronic switch 42, the registers being addressible via serial information propagating on the cable network from the video source. In this regard, see copending patent application Ser. No. 328,337 filed Jan. 31, 1973 for such addressible structure.

The above described arrangement is merely illustrative of the principles of the present invention. Numerous adaptations and modifications thereof will be readily apparent to those skilled in the art without departing from the spirit and scope of the present invention.

What is claimed is:

1. In combination, cable video propagating means, means connected to said cable means for supplying thereto at least one video signal, and video reception inhibiting means connected to said cable means for suppressing reception of said video signal on said cable means, said reception inhibiting means comprising electronically controlled variable attenuation filter means tuned to the spectrum of said video signal, said filter means including means exhibiting an attenuation dependent upon the value of an electronic control signal, and filter attenuation modulating signal generator means for supplying a control signal of relatively high frequency to said filter means for varying the attenuation characteristic of said filter means.

2. A combination as in claim 1 wherein said filter means comprises a series resonant circuit, and electronically controlled means connected in parallel with a portion of said series resonant circuit to selectively alternately vary the radio frequency impedance state of said resonant circuit portion.

3. A combination as in claim 2 wherein said series resonant circuits comprise a series connected capacitance and inductance, and wherein said alternating radio frequency impedance means comprises a diode connected to the junction of said capacitance and inductance, and oscillator means for selectively forward biasing said diode.

4. A combination as in claim 3 further comprising additional capacitance means connected to the junction between said diode and said oscillator means, the capacitance of said additional capacitance means greatly exceeding that of said capacitance included in said series tuned circuit.

5. A combination as in claim 4 further comprising a source of fixed potential, and switching means for connecting said diode to one of said potential source and said oscillating means.

6. A combination as in claim 3 wherein said inductance in said series tuned circuit comprises a parallel resonant circuit tuned below resonance.

7. A combination as in claim 2 wherein said electronically controlled means includes means for varying the resonant frequency of said series resonant circuit.

8. A combination as in claim 1 further comprising video receiving means connected to said cable means.

9. A combination as in claim 8 wherein said video signal supplying means supplies said at least one signal in a form not recoverable by a conventional television receiver, and wherein said signal receiving means comprises converter means connected to said cable means for converting said at least one signal to a form which is recoverable by said receiver.

10. In combination in apparatus for inhibiting reception of a video signal distributed via a signal distribution cable, a band elimination filter means exhibiting an attenuation characteristic which varies in degree of attenuation as a function of an input control signal, and filter attenuation modulating signal generator means connected to said band elimination filter for supplying thereto a control signal for varying the attenuation effected by said filter means, said generator means including means for supplying a signal varying at a rate which exceeds the automatic gain control compensation capacity of television receivers.

11. A combination as in claim 10 wherein said band elimination filter means comprises a series resonant circuit, and electronically controlled means connected in parallel with a portion of said series resonant circuit to selectively alternately vary the radio frequency impedance state of said resonant circuit portion.

12. A combination as in claim 11 wherein said series resonant circuits comprise a series connected capacitance and inductance, and wherein said alternating radio frequency impedance means comprises a diode connected to the junction of said capacitance and inductance, and oscillator means for selectively forward biasing said diode.

13. A combination as in claim 12 further comprising additional capacitance means connected to the junction between said diode and said oscillator means.

14. A combination as in claim 13 further comprising a source of fixed potential and switching means for connecting said diode to one of said potential source and said oscillating means.

15. A combination as in claim 10 further comprising video receiving means connected to said cable means.

16. A combination as in claim 15 wherein said video signal supplying means supplies said at least one signal in a form not recoverable by a conventional television receiver, and wherein said signal receiving means comprises converter means connected to said cable means for converting said at least one signal to a form which is recoverable by said receiver.

* * * * *